United States Patent

Arakage et al.

Patent Number: 6,038,347
Date of Patent: Mar. 14, 2000

[54] METHOD AND APPARATUS FOR COMPRESSING PICTURE-REPRESENTING DATA

[75] Inventors: Kazumi Arakage; Takayuki Sugahara, both of Yokosuka, Japan

[73] Assignee: Victor Company of Japan, Ltd., Yokohama, Japan

[21] Appl. No.: 08/962,662

[22] Filed: Nov. 3, 1997

[51] Int. Cl.[7] ............................... G06K 9/36; H04N 9/74
[52] U.S. Cl. ..................... 382/245; 382/232; 382/251; 348/578
[58] Field of Search ...................... 382/232, 251, 382/199, 173, 100, 284, 236, 241, 242, 245, 325; 348/589, 598, 600, 405, 423, 578, 590

[56] References Cited

U.S. PATENT DOCUMENTS

| 4,695,884 | 9/1987 | Anastassiou et al. | 358/461 |
| 5,138,673 | 8/1992 | Yoshida et al. | 382/232 |
| 5,384,912 | 1/1995 | Ogrinc et al. | 395/164 |
| 5,583,577 | 12/1996 | Tsukagoshi | 348/468 |

FOREIGN PATENT DOCUMENTS

| 0466398 | 1/1992 | European Pat. Off. . |
| 0662770 | 7/1995 | European Pat. Off. . |
| 4-312089 | 11/1992 | Japan . |
| 5-91339 | 4/1993 | Japan . |
| 5-183755 | 7/1993 | Japan . |
| 9733437 | 9/1997 | WIPO ..................................... 345/587 |

OTHER PUBLICATIONS

Hubble L et al: "State of the art in image display systems", Advances in Display Technology, SanDiego, CA, USA, Aug. 29–30 1979, ISSN 0361–0748, Proceedings of the Society of Photo–Optical instrumentation Engineers, 1979, USA, p(S) 2–8 XP002062709.

Yu Zhong et al: "Locating Text in Complex Color Images", Pattern Recognition, vol. 28, No. 10, Oct. 1, 1995, pp. 1523–1535, XP000537669.

Primary Examiner—Jose L. Couso
Assistant Examiner—Duy M. Dang
Attorney, Agent, or Firm—Pollock, Vande Sande & Amernick

[57] ABSTRACT

First data representing a picture is quantized into quantization-resultant data. Information corresponding to a predetermined special effect on a picture represented by the quantization-resultant data is generated in response to the quantization-resultant data. The quantization-resultant data is converted into conversion-resultant data. The conversion-resultant data and the information are multiplexed into multiplexing-resultant data. The multiplexing-resultant data is compressed into compression-resultant data of a predetermined code.

4 Claims, 7 Drawing Sheets

FIG. 6

| CONSECUTIVE PIXEL NUMBER 21 | PIXEL VALUE 22 |

FIG. 7

| 0 | 0 | CONSECUTIVE PIXEL NUMBER 24 | PIXEL VALUE 25 |

FIG. 8

| 0 | 0 | 0 | CONSECUTIVE PIXEL NUMBER 27 | PIXEL VALUE 28 |

FIG. 9

| 0 | 0 | 0 | 0 | CONSECUTIVE PIXEL NUMBER 30 | PIXEL VALUE 31 |

FIG. 10

| 0 | 0 | 0 | 0 | 0 | 0 | 0 | 0 | 0 | 0 | 0 | PIXEL VALUE 33 |

METHOD AND APPARATUS FOR COMPRESSING PICTURE-REPRESENTING DATA

BACKGROUND OF THE INVENTION

1. Field of the Invention

This invention relates to a method of compressing picture-representing data which uses, for example, run-length encoding. This invention also relates to an apparatus for compressing picture-representing data which uses, for example, run-length encoding. This invention further relates to a data recovery apparatus.

2. Description of the Related Art

In "karaoke" systems, it is known to process picture data representative of characters composing words in songs to provide a special effect on the characters before the picture data is quantized and encoded into words of a run-length code. An example of the special effect is to form borders around the characters. Another example of the special effect is to shade the characters.

In such prior-art systems, to enable the special effect to be changed among different types, it is necessary to prepare a plurality of different picture data representative of characters which are suited for the respective types of the special effect. The different picture data are subjected to different types of processing which correspond to the different types of the special effect, respectively. One is selected from among the processing-resultant picture data before being quantized. Accordingly, the prior-art systems tend to require complicated hardware structures.

SUMMARY OF THE INVENTION

It is a first object of this invention to provide an improved method of compressing picture-representing data which uses, for example, run-length encoding.

It is a second object of this invention to provide an improved apparatus for compressing picture-representing data which uses, for example, run-length encoding.

It is a third object of this invention to provide an improved data recovery apparatus.

A first aspect of this invention provides a method of compressing first data representing a picture, comprising the steps of quantizing the first data into quantization-resultant data; generating information in response to the quantization-resultant data, the information corresponding to a predetermined special effect on a picture represented by the quantization-resultant data; converting the quantization-resultant data into conversion-resultant data; multiplexing the conversion-resultant data and the information into multiplexing-resultant data; and compressing the multiplexing-resultant data into compression-resultant data of a predetermined code.

A second aspect of this invention is based on the first aspect thereof, and provides a method wherein the predetermined special effect provides borders to the picture.

A third aspect of this invention provides an apparatus for compressing first data representing a picture, comprising means for quantizing the first data into quantization-resultant data; means for generating information in response to the quantization-resultant data, the information corresponding to a predetermined special effect on a picture represented by the quantization-resultant data; means for converting the quantization-resultant data into conversion-resultant data; means for multiplexing the conversion-resultant data and the information into multiplexing-resultant data; and means for compressing the multiplexing-resultant data into compression-resultant data of a predetermined code.

A fourth aspect of this invention is based on the third aspect thereof, and provides an apparatus wherein the predetermined special effect provides borders to the picture.

A fifth aspect of this invention provides a method of compressing first data representing characters, the first data having segments each corresponding to a pixel, the method comprising the steps of quantizing every 1-pixel-corresponding segment of the first data into a 1-pixel-corresponding segment of second data, wherein every 1-pixel-corresponding segment of the second data is changeable among a first predetermined number of different states corresponding to different luminance levels respectively; generating information of a predetermined special effect with respect to the characters in response to the second data, the information having pieces each corresponding to a pixel and each representing whether or not the corresponding pixel should be a portion corresponding to the special effect; converting every 1-pixel-corresponding segment of the second data into a 1-pixel-corresponding segment of third data, wherein every 1-pixel-corresponding segment of the third data is changeable among a second predetermined number of different states corresponding to different luminance levels respectively; multiplexing every 1-pixel-corresponding segment of the third data and every 1-pixel-corresponding piece of the information of the special effect into a 1-pixel-corresponding segment of fourth data, wherein every 1-pixel-corresponding segment of the fourth data is changeable among a third predetermined number of different states, and wherein at least one of the different states of every 1-pixel-corresponding segment of the fourth data is assigned to a 1-pixel-corresponding piece of the information of the special effect which represents that a corresponding pixel should be a portion corresponding to the special effect while others of the different states of every 1-pixel-corresponding segment of the fourth data are assigned to every 1-pixel-corresponding segment of the third data and a 1-pixel-corresponding piece of the information of the special effect which represents that a corresponding pixel should not be a portion corresponding to the special effect; and compressing the fourth data into fifth data of a predetermined code.

A sixth aspect of this invention provides an apparatus for compressing first data representing characters, the first data having segments each corresponding to a pixel, the apparatus comprising means for quantizing every 1-pixel-corresponding segment of the first data into a 1-pixel-corresponding segment of second data, wherein every 1-pixel-corresponding segment of the second data is changeable among a first predetermined number of different states corresponding to different luminance levels respectively; means for generating information of a predetermined special effect with respect to the characters in response to the second data, the information having pieces each corresponding to a pixel and each representing whether or not the corresponding pixel should be a portion corresponding to the special effect; means for converting every 1-pixel-corresponding segment of the second data into a 1-pixel-corresponding segment of third data, wherein every 1-pixel-corresponding segment of the third data is changeable among a second predetermined number of different states corresponding to different luminance levels respectively; means for multiplexing every 1-pixel-corresponding segment of the third data and every 1-pixel-corresponding piece of the information of the special effect into a 1-pixel-corresponding segment of fourth data, wherein every 1-pixel-corresponding segment of the fourth data is changeable among a third predetermined number of different states, and wherein at least one of the different states of every 1-pixel-corresponding segment of the fourth data is assigned to a 1-pixel-corresponding piece of the information of the special effect which represents that a corresponding pixel should be a portion corresponding to the special effect while others of the different states of every 1-pixel-corresponding segment of the fourth data are assigned to every 1-pixel-corresponding segment of the third data and a 1-pixel-corresponding piece of the information of the special effect which represents that a corresponding pixel should not be a portion corresponding to the special effect; and means for compressing the fourth data into fifth data of a predetermined code.

A seventh aspect of this invention provides a data recovery apparatus comprising means for expanding first data into second data, the first data including information of characters and information of a predetermined special effect related to the characters, the second data having segments each corresponding to a pixel, wherein every 1-pixel-corresponding segment of the second data is changeable among different states, wherein at least predetermined one of the different states of every 1-pixel-corresponding segment of the second data is assigned to a 1-pixel-corresponding piece of the information of the special effect which represents that a corresponding pixel should be a portion corresponding to the special effect while others of the different states of every 1-pixel-corresponding segment of the second data are assigned to every 1-pixel-corresponding piece of the information of the characters and a 1-pixel-corresponding piece of the information of the special effect which represents that a corresponding pixel should not be a portion corresponding to the special effect; and means for detecting whether or not a state of every 1-pixel-corresponding segment of the second data agrees with the predetermined one of the different states to decide whether or not a corresponding pixel should be a portion corresponding to the special effect.

An eighth aspect of this invention provides a method of compressing first data representing characters, the first data having segments each corresponding to a pixel, the method comprising the steps of quantizing every 1-pixel-corresponding segment of the first data into a 1-pixel-corresponding segment of second data, wherein every 1-pixel-corresponding segment of the second data is changeable among a first predetermined number of different states corresponding to different luminance levels respectively; generating information of borders with respect to the characters in response to the second data, the information having pieces each corresponding to a pixel and each representing whether or not the corresponding pixel should be a portion of the borders; converting every 1-pixel-corresponding segment of the second data into a 1-pixel-corresponding segment of third data, wherein every 1-pixel-corresponding segment of the third data is changeable among a second predetermined number of different states corresponding to different luminance levels respectively, the second predetermined number is smaller than the first predetermined number; multiplexing every 1-pixel-corresponding segment of the third data and every 1-pixel-corresponding piece of the information of borders into a 1-pixel-corresponding segment of fourth data, wherein every 1-pixel-corresponding segment of the fourth data is changeable among a third predetermined number of different states, the third predetermined number being equal to the first predetermined number, and wherein at least one of the different states of every 1-pixel-corresponding segment of the fourth data is assigned to a 1-pixel-corresponding piece of the information of borders which represents that a corresponding pixel should be a portion of the borders while others of the different states of every 1-pixel-corresponding segment of the fourth data are assigned to every 1-pixel-corresponding segment of the third data and a 1-pixel-corresponding piece of the information of borders which represents that a corresponding pixel should not be a portion of the borders; and compressing the fourth data into fifth data of a predetermined code.

A ninth aspect of this invention provides an apparatus for compressing first data representing characters, the first data having segments each corresponding to a pixel, the apparatus comprising means for quantizing every 1-pixel-corresponding segment of the first data into a 1-pixel-corresponding segment of second data, wherein every 1-pixel-corresponding segment of the second data is changeable among a first predetermined number of different states corresponding to different luminance levels respectively; means for generating information of borders with respect to the characters in response to the second data, the information having pieces each corresponding to a pixel and each representing whether or not the corresponding pixel should be a portion of the borders; means for converting every 1-pixel-corresponding segment of the second data into a 1-pixel-corresponding segment of third data, wherein every 1-pixel-corresponding segment of the third data is changeable among a second predetermined number of different states corresponding to different luminance levels respectively, the second predetermined number is smaller than the first predetermined number; means for multiplexing every 1-pixel-corresponding segment of the third data and every 1-pixel-corresponding piece of the information of borders into a 1-pixel-corresponding segment of fourth data, wherein every 1-pixel-corresponding segment of the fourth data is changeable among a third predetermined number of different states, the third predetermined number being equal to the first predetermined number, and wherein at least one of the different states of every 1-pixel-corresponding segment of the fourth data is assigned to a 1-pixel-corresponding piece of the information of borders which represents that a corresponding pixel should be a portion of the borders while others of the different states of every 1-pixel-corresponding segment of the fourth data are assigned to every 1-pixel-corresponding segment of the third data and a 1-pixel-corresponding piece of the information of borders which represents that a corresponding pixel should not be a portion of the borders; and means for compressing the fourth data into fifth data of a predetermined code.

A tenth aspect of this invention provides a data recovery apparatus comprising means for expanding first data into second data, the first data including information of characters and information of borders related to the characters, the second data having segments each corresponding to a pixel, wherein every 1-pixel-corresponding segment of the second data is changeable among different states, wherein at least predetermined one of the different states of every 1-pixel-corresponding segment of the second data is assigned to a 1-pixel-corresponding piece of the information of borders which represents that a corresponding pixel should be a portion of the borders while others of the different states of every 1-pixel-corresponding segment of the second data are assigned to every 1-pixel-corresponding piece of the information of the characters and a 1-pixel-corresponding piece of the information of borders which represents that a corresponding pixel should not be a portion of the borders; and means for detecting whether or not a state of every 1-pixel-corresponding segment of the second data agrees with the predetermined one of the different states to decide whether or not a corresponding pixel should be a portion of the borders.

BRIEF DESCRIPTION OF THE DRAWINGS

FIG. 6 to FIG. 10 are diagrams of run-length code words.

DESCRIPTION OF THE PREFERRED EMBODIMENTS

A prior-art apparatus for compressing picture-representing data will be explained for a better understanding of this invention.

Figure 1:
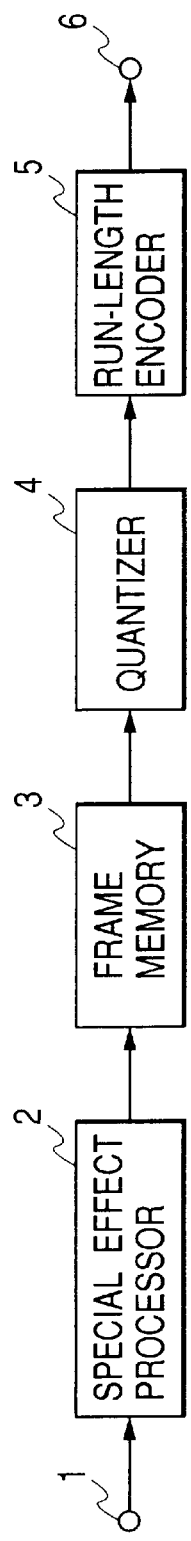
FIG. 1 is a block diagram of a prior-art picture-data compressing apparatus.

With reference to FIG. 1, a prior-art picture-data compressing apparatus includes an input terminal 1 and a special effect processor 2. Input picture data representative of characters composing words in a song is applied to the special effect processor 2 via the input terminal 1. The input picture data is processed by the special effect processor 2 to implement a special effect on the characters. The processing-resultant picture data is outputted from the special effect processor 2 before being stored into a frame memory 3.

Pieces of the picture data are successively read out from the frame memory 3, and are then fed to a quantizer 4. Each of the picture data pieces is quantized by the quantizer 4 into a data piece changeable among plural different states which correspond to different tones (luminance levels or gradients) respectively. The quantization-resultant data pieces are successively outputted from the quantizer 4 to a run-length encoder 5. The quantization-resultant data pieces are encoded by the run-length encoder 5 into corresponding words of a given run-length code. The words of the given run-length code compose an encoding-resultant signal which has a bit stream. The encoding-resultant signal is outputted from the run-length encoder 5 to an output terminal 6 before being transmitted to an external device (not shown).

To enable the special effect to be changed among different types, it is necessary to prepare different special effect processors corresponding to the respective types of the special effect. In addition, it is necessary to prepare a plurality of different picture data representative of characters which are suited for the respective types of the special effect. The different picture data are subjected by the special effect processors to different types of processing which correspond to the different types of the special effect, respectively. One is selected from among the processing-resultant picture data before being quantized. Accordingly, to enable the special effect to be changed among different types, a complicated hardware structure tends to be required. Examples of the different types of the special effect are different-thickness borders around characters.

First Embodiment

There are a main digital signal and a sub digital signal. The main digital signal represents main picture information which is periodically updated frame by frame or field by field. The sub digital signal represents sub picture information which is also periodically updated frame by frame or field by field. The sub picture information indicates, for example, words in a song or captions in a movie. In the following explanation, the picture information represented by the main digital signal is regarded as a background while the picture information represented by the sub digital signal is regarded as a foreground.

The main digital signal is encoded into a main encoding-resultant signal in a known way. The sub digital signal is encoded into a sub encoding-resultant signal in a new way according to a first embodiment of this invention. In general, the main encoding-resultant signal and the sub encoding-resultant signal are combined or multiplexed into a composite signal. The composite signal is transmitted to a decoder side via a transmission line. In the decoder side, the main picture information and the sub picture information are recovered from the composite signal. The recovered main picture information and the recovered sub picture information are indicated by a display on a superimposition basis.

Figure 2:
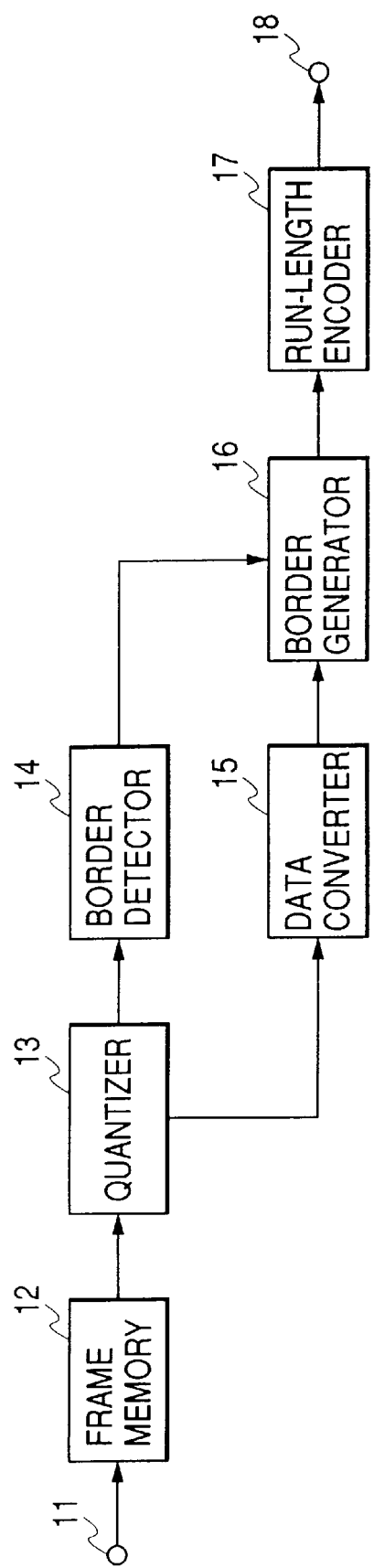
FIG. 2 is a block diagram of a picture-data compressing apparatus according to a first embodiment of this invention.

With reference to FIG. 2, a picture-data compressing apparatus includes an input terminal 11 and a frame memory 12. Input picture data is applied to the frame memory 12 via the input terminal 11. The input picture data corresponds the previously indicated sub digital signal. The input picture data represents, for example, characters composing words in a song or captions in a movie.

The input picture data has a stream of 1-pixel-corresponding data segments. The input picture data is temporarily stored in the frame memory 12 before being fed to a quantizer 13 pixel by pixel.

Every 1-pixel-corresponding segment of the picture data outputted from the frame memory 12 is quantized by the quantizer 13 into a 4-value data segment according to the luminance (the brightness) represented by the 1-pixel-corresponding segment. Every 4-value data segment generated by the quantizer 13 has two bits. Every 4-value data segment generated by the quantizer 13 can change among four different states (four different values), that is, "00", "01", "10", and "11". The four different states are also referred to as four different pixel code words.

Figure 3:
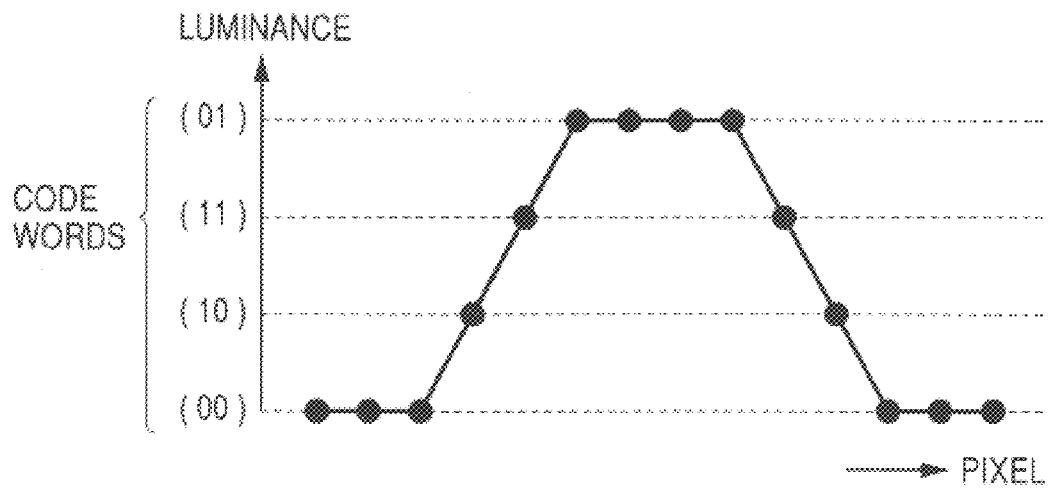
FIG. 3 is a diagram of a first relation between code words and luminance levels.

As shown in FIG. 3, the pixel code words related to the 4-value data segments generated by the quantizer 13 are assigned to different luminance levels (different brightness levels) respectively. Specifically, the pixel code word "01" is assigned to a highest luminance level (a highest brightness level). The pixel code word "11" is assigned to a second highest luminance level (a second highest brightness level). The pixel code word "10" is assigned to a third highest luminance level (a third highest brightness level). The pixel code word "00" is assigned to a lowest luminance level (a lowest brightness level) corresponding to a background.

With reference back to FIG. 2, every 4-value data segment is outputted from the quantizer 13 to a border detector 14 and a data converter 15. The border detector 14 generates information of borders from the 4-value data segments fed from the quantizer 13. The borders relate to characters which compose words or captions and which are represented by the 4-value data segments. The border detector 14 outputs the generated information of borders to a border generator 16.

Figure 4:
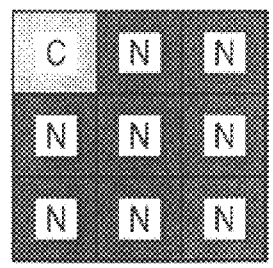
FIG. 4 is a diagram of a window composed of nine neighboring pixels in the first embodiment of this invention.

The border detector 14 includes a memory for collecting nine 4-value data segments corresponding to nine neighboring pixels in a same frame or a same field. The nine neighboring pixels form a window. As shown in FIG. 4, the nine neighboring pixels is in an arrangement (a window) of 3 by 3. In FIG. 4, "C" denotes a pixel of interest while "N" denotes each pixel near the pixel of interest. In FIG. 4, the pixel "C" of interest occupies the upper left corner of the 3-by-3 arrangement. The 3-by-3 arrangement in FIG. 4 is designed to provide 2-pixel-width borders in areas extending adjacently rightward and downward of the characters. The border detector 14 decides whether or not the nine 4-value data segments are in specified conditions in which the pixel code word of the 4-value data segment corresponding to the pixel "C" of interest is "01", "10", or "11" while all the pixel code words of the 4-value data segments corresponding to the near pixels "N" are "00". When the nine 4-value data segments are in the specified conditions, the border detector 14 decides that all the near pixels "N" should form portions of borders. The border detector 14 uses positional information of the 4-value data segments corresponding to the near pixels "N" in generating information of borders. When the nine 4-value data segments are not in the specified conditions, the border detector 14 decides that the near pixels "N" should not form portions of borders. The border detector 14 uses positional information of the 4-value data segments corresponding to the near pixels "N" in generating information of borders. The nine 4-value data segments collected in the border detector 14 are periodically updated so that the window will move and the pixel "C" of interest will shift one by one in a predetermined scan order with respect to "frame" or "field". The above-indicated sequence of processes is reiterated while the window is moved. As a result, information of borders which corresponds to a frame or a field is generated.

The information of borders which is generated by the border detector 14 has pieces each corresponding to a pixel. Every piece of the information of borders represents whether or not a related pixel should be a portion of borders. The border detector 14 successively outputs the pieces of the information of borders to the border generator 16.

For example, the border detector 14 converts every 4-value data segment into a 2-value data segment which is either "0" or "1". Every 4-value data segment corresponding to a pixel which should not be a portion of borders is converted into a 2-value data segment being "0". Every 4-value data segment corresponding to a pixel which should be a portion of borders is converted into a 2-value data segment being "1". The 2-value data segments are successively outputted from the border detector 14 to the border generator 16 as 1-pixel-corresponding pieces of the information of borders.

The data converter 15 changes every 4-value data segment into a 3-value data segment. Every 3-value data segment generated by the data converter 15 has two bits. Every 3-value data segment generated by the data converter 15 can change among three different states (three different values), that is, "00", "01", and "10". The three different states are also referred to as three different pixel code words. The 3-value data segments are successively outputted from the data converter 15 to the border generator 16.

Specifically, the data converter 15 changes every 4-value data segment of "11" to a 3-value data segment of "10". The data converter 15 directly uses every 4-value data segment of "00" as a 3-value data segment of "00". The data converter 15 directly uses every 4-value data segment of "10" as a 3-value data segment of "10". The data converter 15 directly uses every 4-value data segment of "01" as a 3-value data segment of "01".

Figure 5:
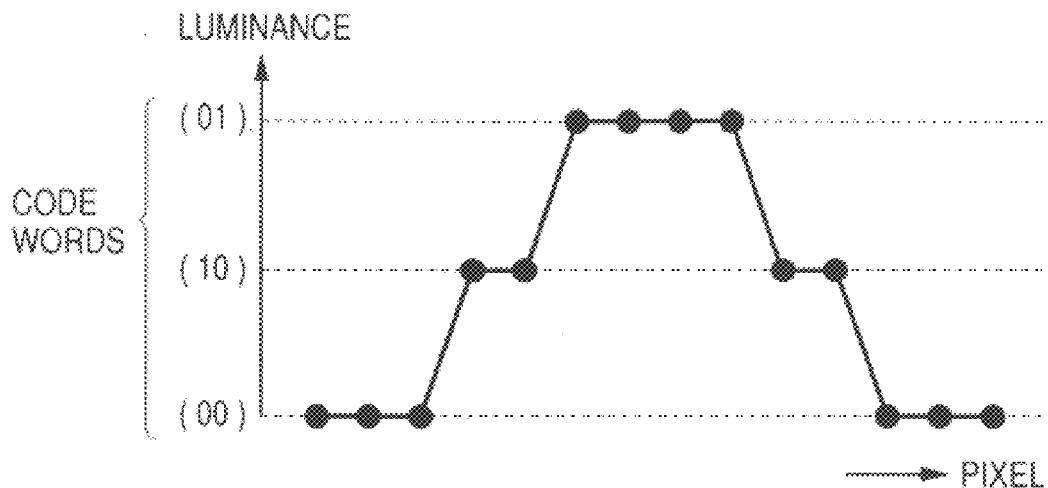
FIG. 5 is a diagram of a second relation between code words and luminance levels.

As shown in FIG. 5, the pixel code words related to the 3-value data segments generated by the data converter 15 are assigned to different luminance levels (different brightness levels) respectively. Specifically, the pixel code word "01" is assigned to a highest luminance level (a highest brightness level) equal to the highest luminance level (the highest brightness level) related to the 4-value data segments generated by the quantizer 13. The pixel code word "10" is assigned to a second highest luminance level (a second highest brightness level) equal to a mean value or an average value between the second highest luminance level (the second highest brightness level) and the third highest luminance level (the third highest brightness level) related to the 4-value data segments generated by the quantizer 13. The pixel code word "00" is assigned to a lowest luminance level (a lowest brightness level) equal to the lowest luminance level (the lowest brightness level) related to the 4-value data segments generated by the quantizer 13.

The border generator 16 successively receives the 3-value data segments from the data converter 15. Also, the border generator 16 successively receives the pieces of the information of borders from the border detector 14. The 3-value data segment and the piece of the information of borders which are received by the border generator 16 at the same time correspond to a same pixel. The border generator 16 changes every 3-value data segment into a 4-value data segment in response to the corresponding piece of the information of borders. Every 4-value data segment generated by the border generator 16 has two bits. Every 4-value data segment generated by the border generator 16 can change among four different states (four different values), that is, "00", "01", "10", and "11". The four different states are also referred to as four different pixel code words. The 4-value data segments are successively outputted from the border generator 16 to a run-length encoder 17.

Specifically, when the piece of the information of borders represents that a related pixel should be a portion of borders, the border generator 16 changes the corresponding 3-value data segment to a 4-value data segment of "11". When the piece of the information of borders represents that a related pixel should not be a portion of borders, the border generator 16 directly uses the corresponding 3-value data segment as a 4-value data segment without changing the state of the 3-value data segment. Thus, in this case, a 3-value data segment of "00", a 3-value data segment of "01", and a 3-value data segment of "10" are directly used as a 4-value data segment of "00", a 4-value data segment of "01", and a 4-value data segment of "10", respectively. Accordingly, every 4-value data segment of "11" which is generated by the border generator 16 represents that a corresponding pixel should be a portion of borders. On the other hand, 4-value data segments of other states which are generated by the border generator 16 represent that corresponding pixels should not be portions of borders.

As understood from the previous explanation, the border generator 16 combines or multiplexes every 3-value data segment and every piece of the information of borders into a 4-value data segment.

As previously indicated, the 4-value data segments are successively outputted from the border generator 16 to the run-length encoder 17. The 4-value data segments are encoded by the run-length encoder 17 into corresponding words of a given run-length code. The words of the given run-length code compose an encoding-resultant signal. The encoding-resultant signal has a bit stream. The encoding-resultant signal is outputted from the run-length encoder 17 to an output terminal 18 before being transmitted to an external device (not shown in FIG. 2).

The operation of the run-length encoder 17 will be explained in more detail. When a present 4-value data segment differs in state from the immediately preceding 4-value data segment, the run-length encoder 17 generates a code word having a sequence of four bits. As shown in FIG. 6, the sequence of four bits is divided into a former half 21 and a latter half 22. The former half 21 has two bits. Also, the latter half 22 has two bits. The former half 21 is set to a state representing a number equal to "1". The latter half 22 is set to a state equal to the state of the present 4-value data segment.

When there is a succession of two or three 4-value data segments in a same state, the run-length encoder 17 generates a code word having a sequence of four bits. As shown in FIG. 6, the sequence of four bits is divided into a former half 21 and a latter half 22. The former half 21 is set to a state representing a succession number equal to "2" or "3". The latter half 22 is set to a state equal to the state of the 4-value data segments.

When there is a succession of four to fifteen 4-value data segments in a same state, the run-length encoder 17 generates a code word having a sequence of eight bits. As shown in FIG. 7, the sequence of eight bits is divided into a head portion 23, an intermediate portion 24, and an end portion 25. The head portion 23 has two bits. The intermediate portion 24 has four bits. The end portion 25 has two bits. The head portion 23 is set to "00". The intermediate portion 24 is set to a state representing a succession number equal to "4" to "15". The end portion 25 is set to a state equal to the state of the 4-value data segments.

When there is a succession of sixteen to sixty-three 4-value data segments in a same state, the run-length encoder 17 generates a code word having a sequence of twelve bits. As shown in FIG. 8, the sequence of twelve bits is divided into a head portion 26, an intermediate portion 27, and an end portion 28. The head portion 26 has four bits. The intermediate portion 27 has six bits. The end portion 28 has two bits. The head portion 26 is set to "0000". The intermediate portion 27 is set to a state representing a succession number equal to "16" to "63". The end portion 28 is set to a state equal to the state of the 4-value data segments.

When there is a succession of sixty-four to two hundred and fifty-five 4-value data segments in a same state, the run-length encoder 17 generates a code word having a sequence of sixteen bits. As shown in FIG. 9, the sequence of sixteen bits is divided into a head portion 29, an intermediate portion 30, and an end portion 31. The head portion 29 has six bits. The intermediate portion 30 has eight bits. The end portion 31 has two bits. The head portion 29 is set to "000000". The intermediate portion 30 is set to a state representing a succession number equal to "64" to "255". The end portion 31 is set to a state equal to the state of the 4-value data segments.

When there is a succession of two hundred and fifty-six or more 4-value data segments in a same state as viewed in a same line of pixels, the run-length encoder 17 generates a code word having a sequence of sixteen bits. As shown in FIG. 10, the sequence of sixteen bits is divided into a former portion 32, and a latter portion 33. The former portion 32 has fourteen bits. The latter portion 33 has two bits. The former portion 32 is set to "00000000000000". The latter portion 33 is set to a state equal to the state of the 4-value data segments.

It should be noted that the run-length encoder 17 may be replaced by an MR (modified READ) encoder or an MMR (modified modified READ) encoder.

Figure 11:
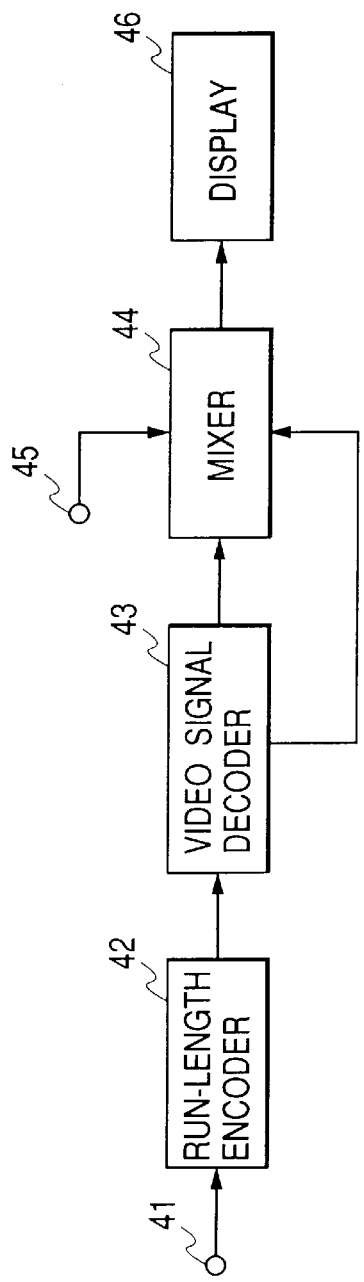
FIG. 11 is a block diagram of a picture-data recovery apparatus.

With reference to FIG. 11, a picture-data recovery apparatus includes an input terminal 41 which can be connected to the output terminal 18 in FIG. 2 via a transmission line. A bit stream of the given run-length code is fed via the input terminal 41 to a run-length decoder 42 contained in the picture-data recovery apparatus. The operation of the run-length decoder 42 is inverse with respect to the operation of the run-length encoder 17 in FIG. 2. The run-length decoder 42 decodes the bit stream of the given run-length code into a sequence of 4-value data segments which correspond to pixels respectively. The 4-value data segments generated by the run-length decoder 42 correspond to the 4-value data segments generated by the border generator 16 in FIG. 2. The run-length decoder 42 successively outputs the 4-value data segments to a video signal decoder 43.

The video signal decoder 43 includes a ROM in which decoding tables (data conversion tables) are provided. The video signal decoder 43 refers to the decoding tables, and thereby converts every 4-value data segment of "00" into a 1-pixel-corresponding segment of a sub video signal which has a luminance level (a Y level) of "0", a first chrominance level (a Cb level) of "128", and a second chrominance level (a Cr level) of "128". In addition, the video signal decoder 43 generates a control signal representative of a desired mixing ratio of 0% from every 4-value data segment of "00" by referring to one of the decoding tables. The video signal decoder 43 refers to the decoding tables, and thereby converts every 4-value data segment of "01" into a 1-pixel-corresponding segment of a sub video signal which has a luminance level (a Y level) of "255", a first chrominance level (a Cb level) of "128", and a second chrominance level (a Cr level) of "128". In addition, the video signal decoder 43 generates a control signal representative of a desired mixing ratio of 100% from every 4-value data segment of "01" by referring to one of the decoding tables. The video signal decoder 43 refers to the decoding tables, and thereby converts every 4-value data segment of "10" into a 1-pixel-corresponding segment of a sub video signal which has a luminance level (a Y level) of "128", a first chrominance level (a Cb level) of "128", and a second chrominance level (a Cr level) of "128". In addition, the video signal decoder 43 generates a control signal representative of a desired mixing ratio of 45% from every 4-value data segment of "10" by referring to one of the decoding tables. The video signal decoder 43 refers to the decoding tables, and thereby converts every 4-value data segment of "11" into a 1-pixel-corresponding segment of a sub video signal which has a luminance level (a Y level) of "255", a first chrominance level (a Cb level) of "255", and a second chrominance level (a Cr level) of "0". In addition, the video signal decoder 43 generates a control signal representative of a desired mixing ratio of 100% from every 4-value data segment of "11" by referring to one of the decoding tables. As previously explained, every 4-value data segment of "11" represents that a corresponding pixel should be a portion of borders. The conversion of every 4-value data segment of "11" which is implemented by the video signal decoder 43 enables characters to be provided with "blue" borders. The video signal decoder 43 successively outputs the 1-pixel-corresponding segments of the sub video signal to a mixer 44. Also, the video signal decoder 43 successively outputs the control signals to the mixer 44.

The mixer 44 successively receives 1-pixel-corresponding segments of a main video signal via an input terminal 45. The 1-pixel-corresponding segment of the sub video signal, the control signal, and the 1-pixel-corresponding segment of the main video signal which are received by the mixer 44 at the same time correspond to a same pixel. The mixer 44 mixes the 1-pixel-corresponding segment of the sub video signal and the 1-pixel-corresponding segment of the main video signal into a 1-pixel-corresponding segment of a composite video signal at a mixing ratio equal to the desired mixing ratio represented by the control signal. Thus, the mixer 44 implements superimposition of the sub video signal on the main video signal. In the case where attention is paid to the picture information represented by the sub video signal, the picture information represented by the sub video signal forms a foreground while the picture information represented by the main video signal forms a background. When the mixing ratio is 0%, the 1-pixel-corresponding segment of the composite video signal is equal to the 1-pixel-corresponding segment of the main video signal. Thus, in this case, only the picture information represented by the main video signal, that is, only the background, will be indicated on a related pixel zone of a screen of a display. When the mixing ratio is 100%, the 1-pixel-corresponding segment of the composite video signal is equal to the 1-pixel-corresponding segment of the sub video signal. Thus, in this case, only the picture information represented by the sub video signal, that is, only the foreground, will be indicated on a related pixel zone of a screen of a display. The mixer 44 successively outputs the 1-pixel-corresponding segments of the composite video signal to a display 46.

The display 46 indicates the composite video signal on its screen. Accordingly, the picture information represented by the composite video signal is visualized. The visualized picture information include characters composing words in a song or captions in a movie. As understood from the previous explanation, the characters are provided with blue borders. It should be noted that the run-length decoder 42 may be replaced by an MR (modified READ) decoder or an MMR (modified modified READ) decoder.

Second Embodiment

Figure 12:
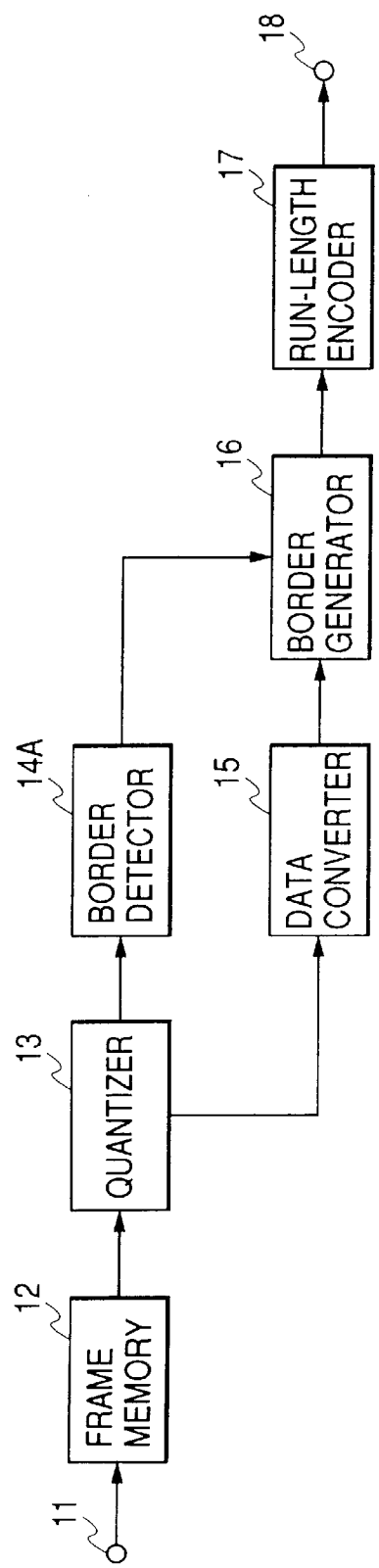
FIG. 12 is a block diagram of a picture-data compressing apparatus according to a second embodiment of this invention.

FIG. 12 shows a second embodiment of this invention which is similar to the first embodiment thereof except that a border detector 14A replaces the border detector 14 in FIG. 2.

The border detector 14A generates information of borders from the 4-value data segments fed from the quantizer 13. The borders relate to characters which compose words or captions and which are represented by the 4-value data segments. The border detector 14A outputs the generated information of borders to the border generator 16.

Figure 13:
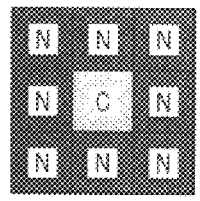
FIG. 13 is a diagram of a window composed of nine neighboring pixels in the second embodiment of this invention.

The border detector 14A includes a memory for collecting nine 4-value data segments corresponding to nine neighboring pixels in a same frame or a same field. The nine neighboring pixels form a window. As shown in FIG. 13, the nine neighboring pixels is in an arrangement of 3 by 3. In FIG. 13, "C" denotes a pixel of interest while "N" denotes each pixel near the pixel of interest. In FIG. 13, the pixel "C" of interest occupies the center of the 3-by-3 arrangement. The 3-by-3 arrangement in FIG. 13 is designed to provide 1-pixel-width borders in areas around the characters. The border detector 14A decides whether or not the nine 4-value data segments are in specified conditions in which the pixel code word of the 4-value data segment corresponding to the pixel "C" of interest is "01", "10", or "11" while all the pixel code words of the 4-value data segments corresponding to the near pixels "N" are "00". When the nine 4-value data segments are in the specified conditions, the border detector 14A decides that all the near pixels "N" should form portions of borders. The border detector 14A uses positional information of the 4-value data segments corresponding to the near pixels "N" in generating information of borders. When the nine 4-value data segments are not in the specified conditions, the border detector 14A decides that the near pixels "N" should not form portions of borders. The border detector 14A uses positional information of the 4-value data segments corresponding to the near pixels "N" in generating information of borders. The nine 4-value data segments collected in the border detector 14A are periodically updated so that the window will move and the pixel "C" of interest will shift one by one in a predetermined scan order with respect to "frame" or "field". The above-indicated sequence of processes is reiterated while the window is moved. As a result, information of borders which corresponds to a frame or a field is generated.

The information of borders which is generated by the border detector 14A has pieces each corresponding to a pixel. Every piece of the information of borders represents whether or not a related pixel should be a portion of borders. The border detector 14A successively outputs the pieces of the information of borders to the border generator 16.

For example, the border detector 14A converts every 4-value data segment into a 2-value data segment which is either "0" or "1". Every 4-value data segment corresponding to a pixel which should not be a portion of borders is converted into a 2-value data segment being "0". Every 4-value data segment corresponding to a pixel which should be a portion of borders is converted into a 2-value data segment being "1". The 2-value data segments are successively outputted from the border detector 14A to the border generator 16 as 1-pixel-corresponding pieces of the information of borders.

Third Embodiment

Figure 14:
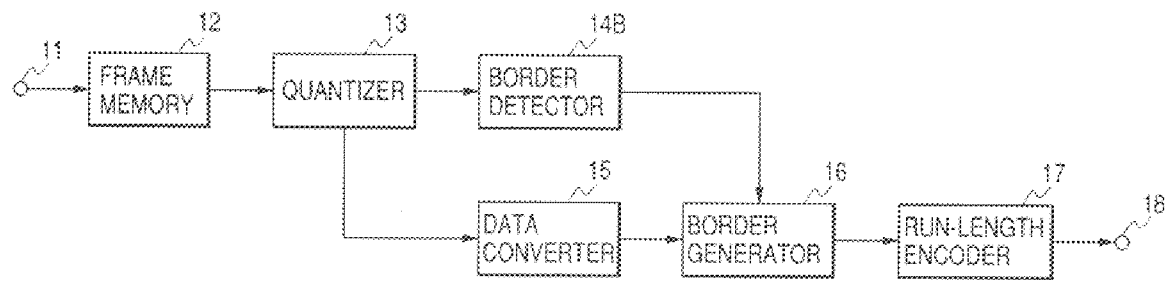
FIG. 14 is a block diagram of a picture-data compressing apparatus according to a third embodiment of this invention.

FIG. 14 shows a third embodiment of this invention which is similar to the first embodiment thereof except that a border detector 14B replaces the border detector 14 in FIG. 2.

The border detector 14B generates information of borders from the 4-value data segments fed from the quantizer 13. The borders relate to characters which compose words or captions and which are represented by the 4-value data segments. The border detector 14B outputs the generated information of borders to the border generator 16.

Figure 15:
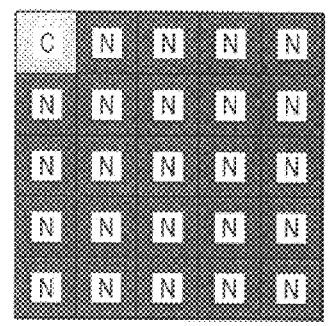
FIG. 15 is a diagram of a window composed of twenty-five neighboring pixels in the third embodiment of this invention.

The border detector 14B includes a memory for collecting twenty-five 4-value data segments corresponding to twenty-five neighboring pixels in a same frame or a same field. The twenty-five neighboring pixels form a window. As shown in FIG. 15, the twenty-five neighboring pixels is in an arrangement of 5 by 5. In FIG. 15, "C" denotes a pixel of interest while "N" denotes each pixel near the pixel of interest. In FIG. 15, the pixel "C" of interest occupies the upper left corner of the 5-by-5 arrangement. The 5-by-5 arrangement in FIG. 15 is designed to provide 4-pixel-width borders in areas extending adjacently rightward and downward of the characters. The border detector 14B decides whether or not the twenty-five 4-value data segments are in specified conditions in which the pixel code word of the 4-value data segment corresponding to the pixel "C" of interest is "01", "10", or "11" while all the pixel code words of the 4-value data segments corresponding to the near pixels "N" are "00". When the twenty-five 4-value data segments are in the specified conditions, the border detector 14B decides that all the near pixels "N" should form portions of borders. The border detector 14B uses positional information of the 4-value data segments corresponding to the near pixels "N" in generating information of borders. When the twenty-five 4-value data segments are not in the specified conditions, the border detector 14B decides that the near pixels "N" should not form portions of borders. The border detector 14B uses positional information of the 4-value data segments corresponding to the near pixels "N" in generating information of borders. The twenty-five 4-value data segments collected in the border detector 14B are periodically updated so that the window will move and the pixel "C" of interest will shift one by one in a predetermined scan order with respect to "frame" or "field". The above-indicated sequence of processes is reiterated while the window is moved. As a result, information of borders which corresponds to a frame or a field is generated.

The information of borders which is generated by the border detector 14B has pieces each corresponding to a pixel. Every piece of the information of borders represents whether or not a related pixel should be a portion of borders. The border detector 14B successively outputs the pieces of the information of borders to the border generator 16.

For example, the border detector 14B converts every 4-value data segment into a 2-value data segment which is either "0" or "1". Every 4-value data segment corresponding to a pixel which should not be a portion of borders is converted into a 2-value data segment being "0". Every 4-value data segment corresponding to a pixel which should be a portion of borders is converted into a 2-value data segment being "1". The 2-value data segments are successively outputted from the border detector 14B to the border generator 16 as 1-pixel-corresponding pieces of the information of borders.

Fourth Embodiment

Figure 16:
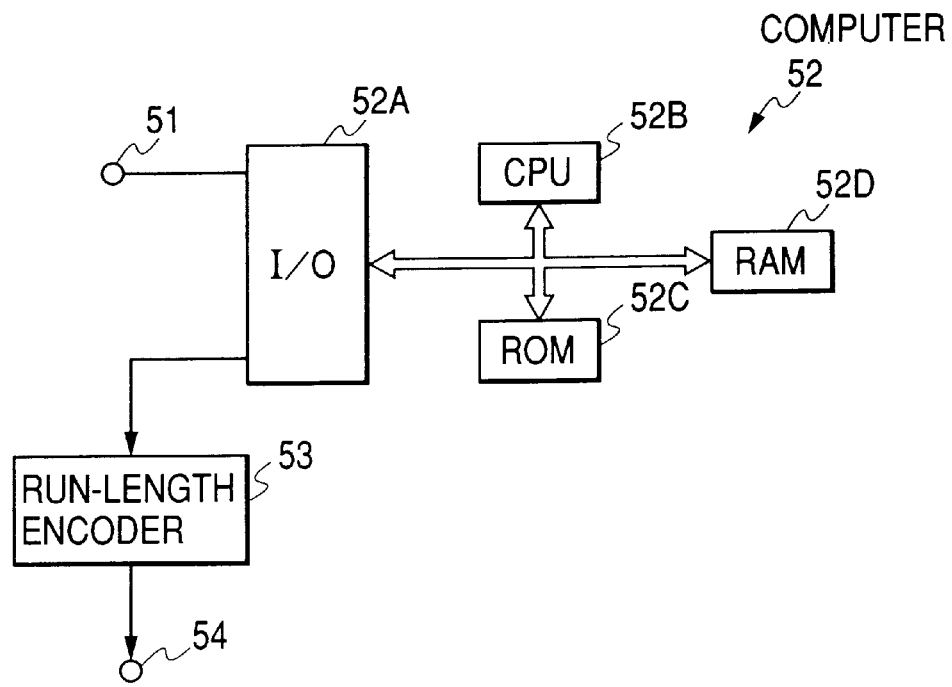
FIG. 16 is a block diagram of a picture-data compressing apparatus according to a fourth embodiment of this invention.

FIG. 16 shows a fourth embodiment of this invention which is similar to the first embodiment thereof except for design changes indicated hereinafter.

With reference to FIG. 16, a picture-data compressing apparatus includes an input terminal 51 and a computer 52. Input picture data is applied to the computer 52 via the input terminal 51. The input picture data represents, for example, characters composing words in a song or captions in a movie. The input picture data has a stream of 1-pixel-corresponding data segments.

The computer 52 includes a combination of an input/output port 52A, a CPU 52B, a ROM 52C, and a RAM 52D. The computer 52 operates in accordance with a program stored in the ROM 52C. The 1-pixel-corresponding segments of the input picture data are successively applied to the input/output port 52A. The computer 52 converts every 1-pixel-corresponding segment of the input picture data into a 1-pixel-corresponding 4-value data segment. The computer 52 successively outputs the 4-value data segments to a run-length encoder 53. Specifically, the 4-value data segments are outputted via the input/output port 52A.

The run-length encoder 53 is similar to the run-length encoder 17 in FIG. 2. The run-length encoder 53 is followed by an output terminal 54. The 4-value data segments are encoded by the run-length encoder 53 into corresponding words of a given run-length code. The words of the given run-length code compose an encoding-resultant signal. The encoding-resultant signal has a bit stream. The encoding-resultant signal is outputted from the run-length encoder 53 to the output terminal 54 before being transmitted to an external device (not shown in FIG. 16).

It should be noted that the computer 52 may be replaced by a digital signal processor or a similar device.

Figure 17:
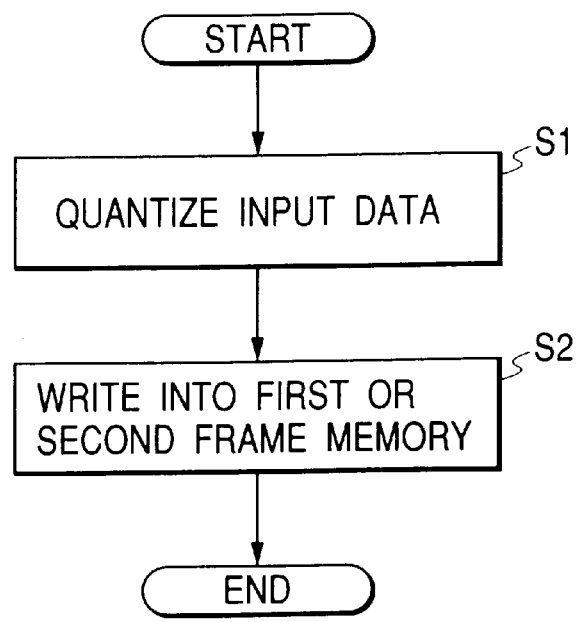
FIG. 17 is a flowchart of a first portion of a program related to a computer in FIG. 16.

FIG. 17 is a flowchart of a first portion of the program related to the computer 52. The program portion in FIG. 17 is executed for every 1-pixel-corresponding segment of the input picture data.

As shown in FIG. 17, a first step S1 of the program portion quantizes a current 1-pixel-corresponding segment of the input picture data into a 4-value data segment according to the luminance (the brightness) represented by the 1-pixel-corresponding segment of the input picture data. Every 4-value data segment generated by the step S1 has two bits. Every 4-value data segment generated by the step S1 can change among four different states (four different values), that is, "00", "01", "10", and "11". The four different states of every 4-value data segment generated by the step S1 correspond to four different luminance levels respectively.

A step S2 following the step S1 writes the 4-value data segment generated by the step S1 into a segment of a first frame memory or a second frame memory which has an address corresponding to the pixel related to the 4-value data segment.

Specifically, the step S2 accesses the first frame memory when the second frame memory is undergoing a data reading process. The step S2 accesses the second frame memory when the first frame memory is undergoing a data reading process. Accordingly, one of the first and second frame memories undergoes a data writing process while the other frame memory undergoes a data reading process. In addition, each of the first and second frame memories alternately undergoes a data writing process and a data reading process. The first and second frame memories are provided in the RAM 52D. After the step S2, the current execution cycle of the program portion ends.

Figure 18:
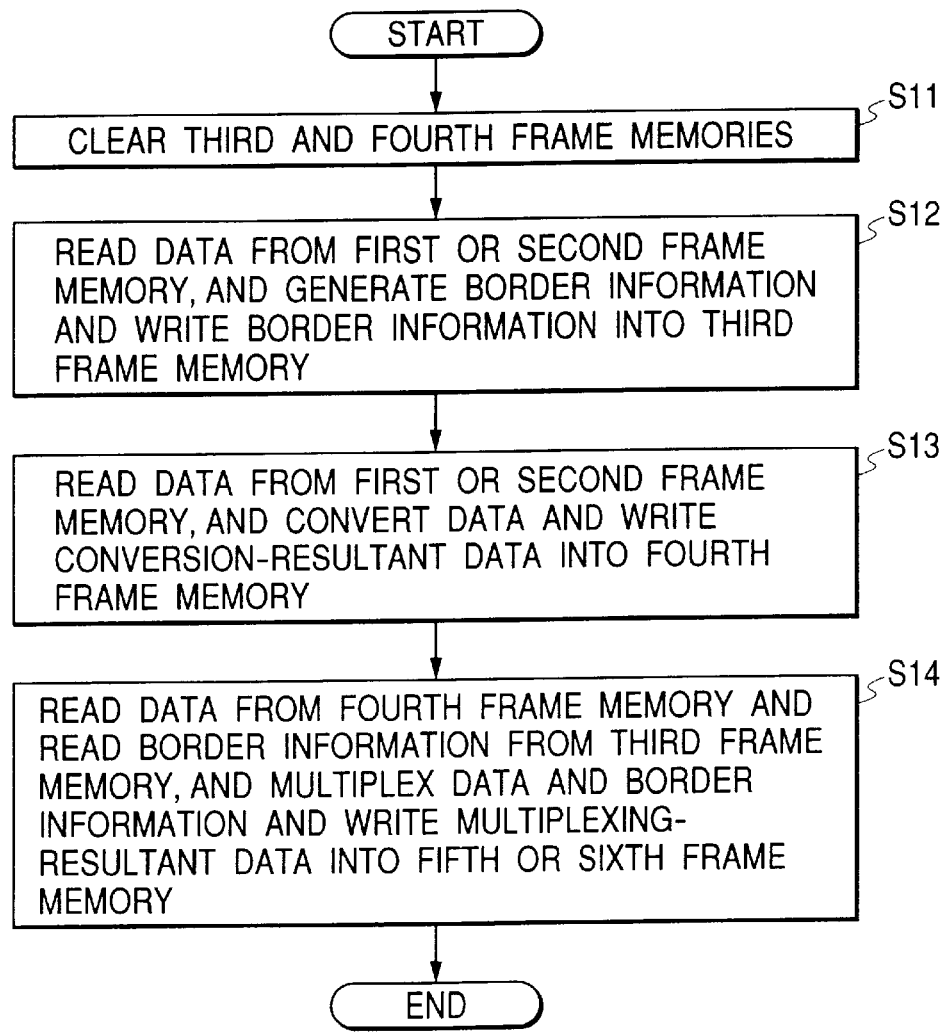
FIG. 18 is a flowchart of a second portion of the program related to the computer in FIG. 16.

FIG. 18 is a flowchart of a second portion of the program related to the computer 52. The program portion in FIG. 18 is executed for every frame or every field related to the input picture data.

As shown in FIG. 18, a first step S11 of the program portion clears a third frame memory and a fourth frame memory provided in the RAM 52D. The third frame memory is designed to store a 1-frame-corresponding set (or a 1-field-corresponding set) of 1-pixel-corresponding signals each having one bit. Thus, the step S11 resets all the 1-bit signals in the third frame memory to "0". As will be made clear later, the 1-bit signals in the third frame memory represent information of borders. The fourth frame memory is designed to store a 1-frame-corresponding set (or a 1-field-corresponding set) of 1-pixel-corresponding signals each having two bits. Thus, the step S11 resets all the 2-bit signals in the fourth frame memory to "00". The 2-bit signals in the fourth frame memory are used as 3-value data segments respectively.

A step S12 following the step S11 accesses the first frame memory or the second frame memory which is not undergoing a data writing process. Specifically, the step S12 reads out nine 4-value data segments from the first frame memory or the second frame memory which correspond to nine neighboring pixels in a same frame or a same field. The nine neighboring pixels form a window. As shown in FIG. 4, the nine neighboring pixels is in an arrangement (a window) of 3 by 3. In FIG. 4, "C" denotes a pixel of interest while "N" denotes each pixel near the pixel of interest. In FIG. 4, the pixel "C" of interest occupies the upper left corner of the 3-by-3 window. The step S12 decides whether or not the nine 4-value data segments are in specified conditions in which the pixel code word of the 4-value data segment corresponding to the pixel "C" of interest is "01", "10", or "11" while all the pixel code words of the 4-value data segments corresponding to the near pixels "N" are "00". When the nine 4-value data segments are in the specified conditions, the step S12 decides that all the near pixels "N" should form portions of borders. In this case, the step S12 sets the 1-bit signals in the third frame memory to "1" which correspond to the near pixels "N" respectively. When the nine 4-value data segments are not in the specified conditions, the step S12 does not access the third frame memory. The step S12 iterates the above-indicated sequence of the processes while moving the window and shifting the pixel "C" of interest one by one in a predetermined scan order with respect to "frame" or "field", that is, while scanning "frame" or "field" pixel by pixel. As a result, the generation of information of borders which correspond to the present frame or the present field is completed. The information of borders is stored in the third frame memory. The information of borders which is stored in the third frame memory has pieces each corresponding to a pixel. Every 1-pixel-corresponding piece of the information of borders which is "1" represents that a corresponding pixel should be a portion of the borders. Every 1-pixel-corresponding piece of the information of borders which is "0" represents that a corresponding pixel should not be a portion of the borders.

It should be noted that the window used by the step S12 may have an arrangement of FIG. 13 or FIG. 15.

A step S13 subsequent to the step S12 successively reads out the 4-value data segments from the first frame memory or the second frame memory which is not undergoing a data writing process. For every 4-value data segment of "11", the step S13 sets the corresponding 3-value data segment in the fourth frame memory to "10". For every 4-value data segment of "00", the step S13 sets the corresponding 3-value data segment in the fourth frame memory to "00". For every 4-value data segment of "10", the step S13 sets the corresponding 3-value data segment in the fourth frame memory to "10". For every 4-value data segment of "01", the step S13 sets the corresponding 3-value data segment in the fourth frame memory to "01". As a result, the setting of the 3-value data segments which correspond to the present frame or the present field is completed. The 3-value data segments are stored in the fourth frame memory.

A step S14 following the step S13 successively reads out the 3-value data segments from the fourth frame memory. In addition, the step S14 successively reads out the 1-pixel-corresponding pieces of the information of borders from the third frame memory. The step S14 generates a 4-value data segment in response to every 3-value data segment and every piece of the information of borders which correspond to a same pixel. Every 4-value data segment generated by the step S14 has two bits. Every 4-value data segment generated by the step S14 can change among four different states (four different values), that is, "00", "01", "10", and "11". The four different states are also referred to as four different pixel code words.

Specifically, when the piece of the information of borders represents that a related pixel should be a portion of borders, that is, when the piece of the information of borders is "1", the step S14 sets the corresponding 4-value data segment to "11" regardless of the state of the corresponding 3-value data segment. When the piece of the information of borders represents that a related pixel should not be a portion of borders, that is, when the piece of the information of borders is "0", the step S14 sets the corresponding 4-value data piece to the state equal to the state of the corresponding 3-value data segment. Thus, in this case, a 4-value data segment of "00", a 4-value data segment of "01", and a 4-value data segment of "10" are generated in response to a 3-value data segment of "00", a 3-value data segment of "01", and a 3-value data segment of "10", respectively. Accordingly, every 4-value data segment of "11" which is generated by the step S14 represents that a corresponding pixel should be a portion of borders. On the other hand, 4-value data segments of other states which are generated by the step S14 represent that corresponding pixels should not be portions of borders.

As understood from the previous explanation, the step S14 combines or multiplexes every 3-value data segment and every piece of the information of borders into a 4-value data segment.

The step S14 writes every generated 4-value data segment into a segment of a fifth frame memory or a sixth frame memory which has an address corresponding to the pixel related to the 4-value data segment. Specifically, the step S14 accesses the fifth frame memory when the sixth frame memory is undergoing a data reading process. The step S14 accesses the sixth frame memory when the fifth frame memory is undergoing a data reading process. Accordingly, one of the fifth and sixth frame memories undergoes a data writing process while the other frame memory undergoes a data reading process. In addition, each of the fifth and sixth frame memories alternately undergoes a data writing process and a data reading process. The fifth and sixth frame memories are provided in the RAM 52D. After the step S14, the current execution cycle of the program portion ends.

Figure 19:
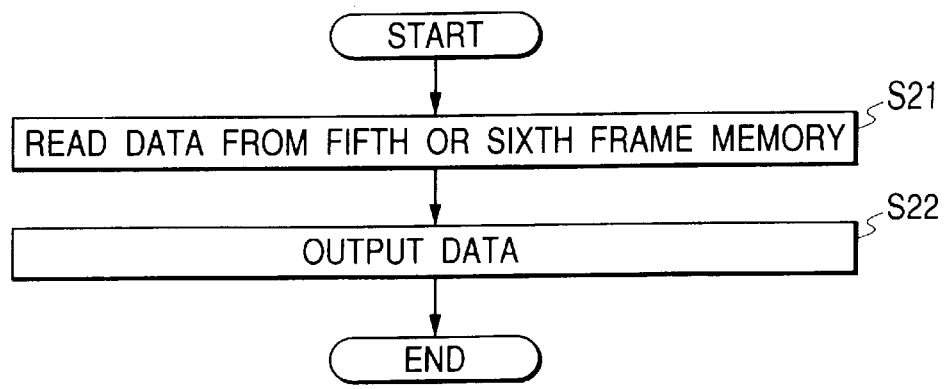
FIG. 19 is a flowchart of a third portion of the program related to the computer in FIG. 16.

FIG. 19 is a flowchart of a third portion of the program related to the computer 52. The program portion in FIG. 19 is executed for every 1-pixel-corresponding segment of the picture data outputted from the computer 52.

As shown in FIG. 19, a first step S21 of the program portion reads out a designated 4-value data segment from the fifth frame memory or the sixth frame memory which is not undergoing a data writing process.

A step S22 following the step S21 outputs the 4-value data segment read out by the step S21 as a 1-pixel-corresponding segment of the output picture data fed to the run-length encoder 53. After the step S22, the current execution cycle of the program portion ends.

It should be noted that the run-length encoder 53 may be replaced by an MR (modified READ) encoder or an MMR (modified modified READ) encoder.

What is claimed is:

1. A method of compressing first data representing a picture, comprising the steps of:

quantizing the first data into quantization-resultant data;

generating information in response to the quantization-resultant data, the information corresponding to a predetermined special effect on a picture represented by the quantization-resultant data, the information being changeable between first and second different states;

converting the quantization-resultant data into conversion-resultant data;

multiplexing the conversion-resultant data and the information into multiplexing-resultant data of a first predetermined code having a set of different first code words, wherein second code words selected from among the first code words are assigned to the conversion-resultant data and also the first state of the information, while a third code word selected from among the first code words and differing from the second code words is assigned to the second state of the information; and compressing the multiplexing-resultant data into compress-resultant data of a second predetermined code.

2. A method as recited in claim 1, wherein the predetermined special effect provides borders to the picture.

3. An apparatus for compressing first data representing a picture, comprising:

means for quantizing the first data into quantization-resultant data;

means for generating information in response to the quantization-resultant data, the information corresponding to a predetermined special effect on a picture represented by the quantization-resultant data, the information being changeable between first and second different states;

means for converting the quantization-resultant data into conversion-resultant data;

means for multiplexing the conversion-resultant data and the information into multiplexing-resultant data of a first predetermined code having a set of different first code words, wherein second code words selected from among the first code words are assigned to the conversion-resultant data and also the first state of the information, while a third code word selected from among the first code words and differing from the second code words is assigned to the second state of the information; and means for compressing the multiplexing-resultant data into compression-resultant data of a second predetermined code.

4. An apparatus as recited in claim 3, wherein the predetermined special effect provides borders to the picture.

* * * * *